United States Patent [19]

Marsland

[11] 4,370,234

[45] Jan. 25, 1983

[54] SYSTEM AND METHOD FOR REMOVING AMMONIA FROM WASTEWATER

[76] Inventor: William P. Marsland, R.R. 3, Box 166, Spring Hill, Kans. 66083

[21] Appl. No.: 231,833

[22] Filed: Feb. 5, 1981

[51] Int. Cl.³ .............................. C02F 1/42; C02F 3/08
[52] U.S. Cl. .................................... 210/617; 210/669; 210/903
[58] Field of Search ............... 210/615, 617, 618, 663, 210/669, 681, 169, 903

[56] References Cited

U.S. PATENT DOCUMENTS

| | | | |
|---|---|---|---|
| 3,116,712 | 1/1964 | Odgen et al. | 119/3 |
| 3,452,966 | 7/1969 | Smolski | 261/77 |
| 3,625,182 | 12/1971 | Williams et al. | 119/3 |
| 3,643,403 | 2/1972 | Speece | 55/53 |
| 3,661,262 | 5/1972 | Sanders | 210/169 |
| 3,842,804 | 10/1974 | Christensen et al. | 119/3 |
| 3,916,834 | 11/1975 | Buss | 119/3 |
| 3,957,017 | 5/1976 | Carmignani et al. | 119/3 |
| 4,043,299 | 8/1977 | Birkbeck et al. | 119/3 |
| 4,098,690 | 7/1978 | Semmens | 210/903 |
| 4,133,760 | 1/1979 | Ogawa | 210/169 |
| 4,141,318 | 2/1979 | MacVane et al. | 119/3 |
| 4,144,840 | 3/1979 | Bubien | 119/3 |
| 4,202,291 | 5/1980 | Kominami | 119/3 |
| 4,231,863 | 11/1980 | Sutphin | 210/615 |
| 4,344,848 | 8/1982 | Hakulinen | 210/617 |

FOREIGN PATENT DOCUMENTS 2001831 2/1979 United Kingdom .

OTHER PUBLICATIONS

Environmental Science and Technology, vol. 11, 3/77, pp. 255-265, "Biological Regeneration of Ammonium Saturated Clinoptiolite" Semmens et al (I).
Journal Water Pollution Control, Dec. 1977, pp. 2431-2444, "Nitrogen Removed by Ion Exchange-Bio Reg of Clinoptilolite" Semmens et al (II).
Journal Water Pollution Control, Dec. 1977, pp. 2928-2940, "Ammonia Removal by Ion Exchange Using Bio-Restored Regenerant" Semmens et al (III).
Aquaculture 4(1974), Johnson et al., "Ammonia Removal by Selective Ion Exchange, A Backup System", pp. 61-68.
UILU-WRC-76-0115 Aug. 1976 Semmens (1), "A feasibility . . . Clinoptilolite".
UIUC-WRC-79-0139 Mar. 1979 Semmens (11), "The Regeneration of Clinoptilolite by Biologically Restored Brine".

Primary Examiner—Ivars C. Cintins
Attorney, Agent, or Firm—Pollock, Vande Sande & Priddy

[57] ABSTRACT

A method and apparatus for treating wastewater containing ammonia by passing the wastewater over a bed of ion exchange particles capable of exchanging ammonium and having a growth of nitrifying bacteria thereon. The wastewater is preferably first oxygenated and then passed through a biological filter, a solids filter, and an organic filter before reaching the ion exchange particles.

28 Claims, 7 Drawing Figures

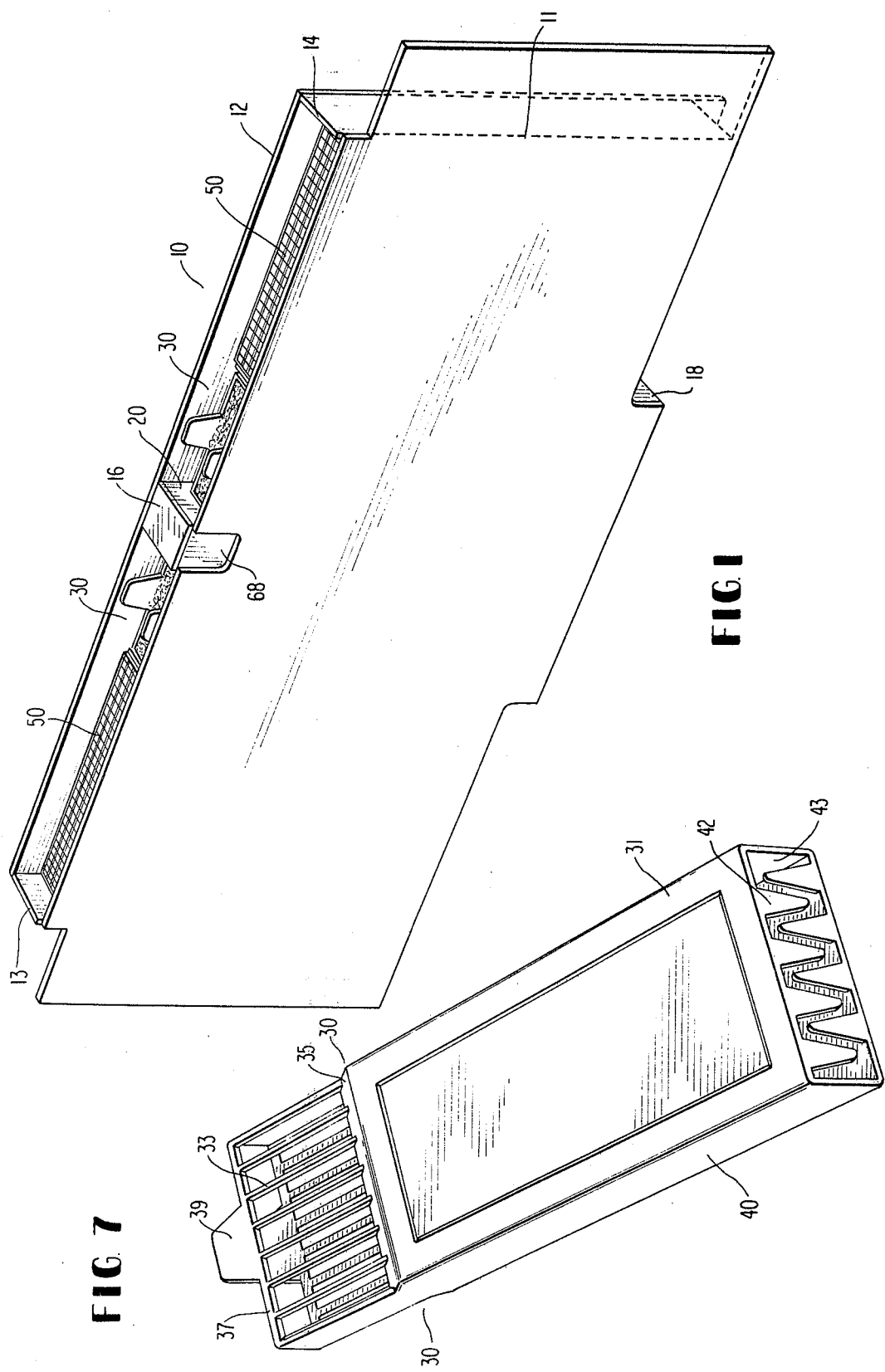

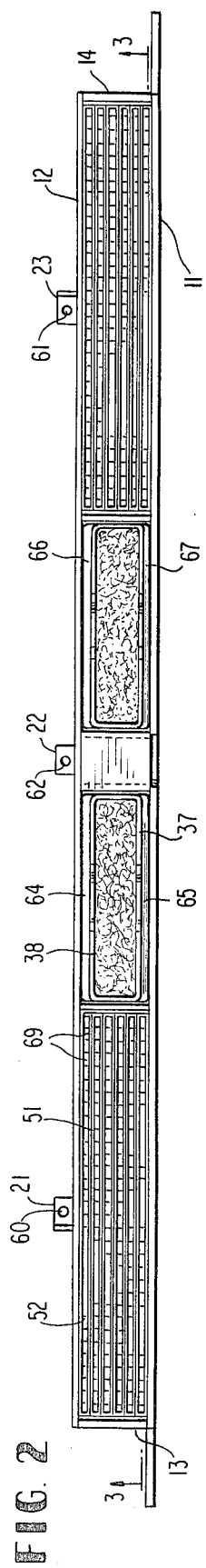
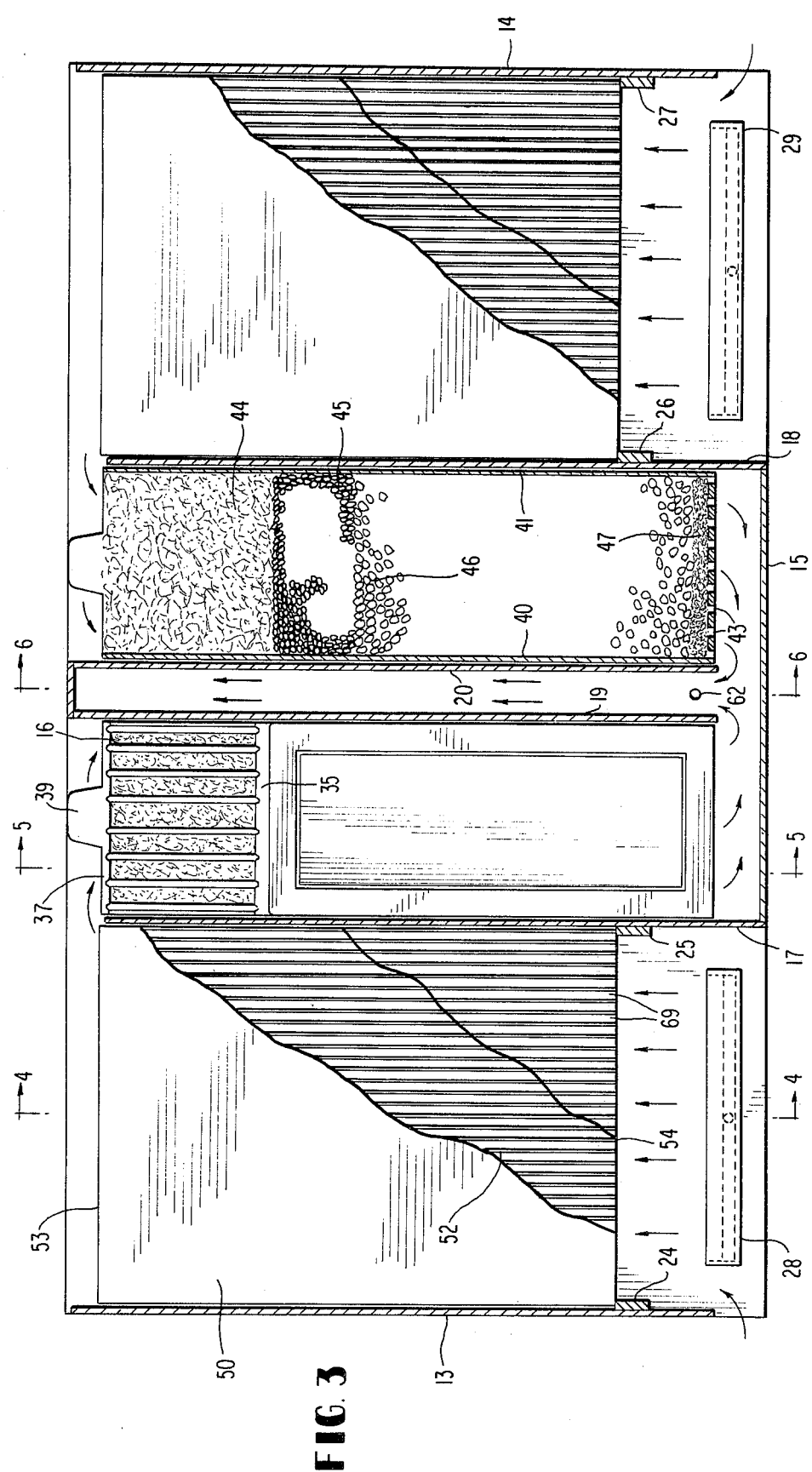

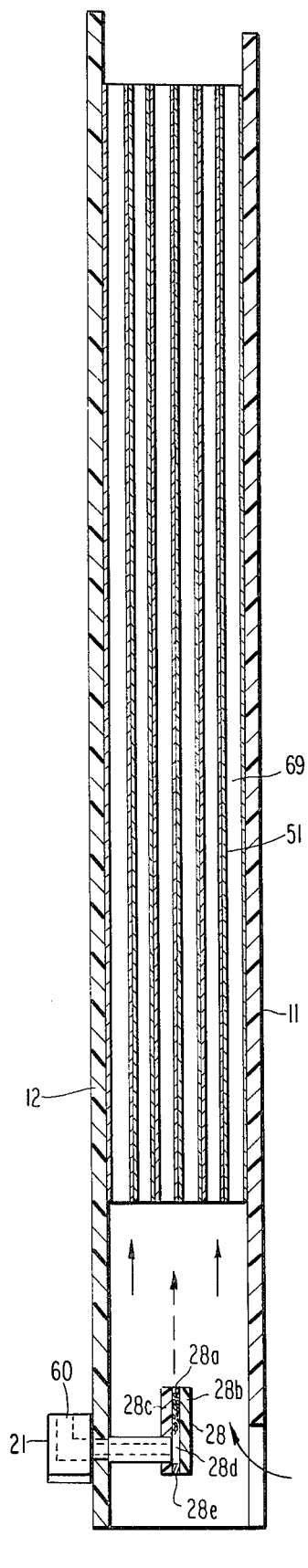
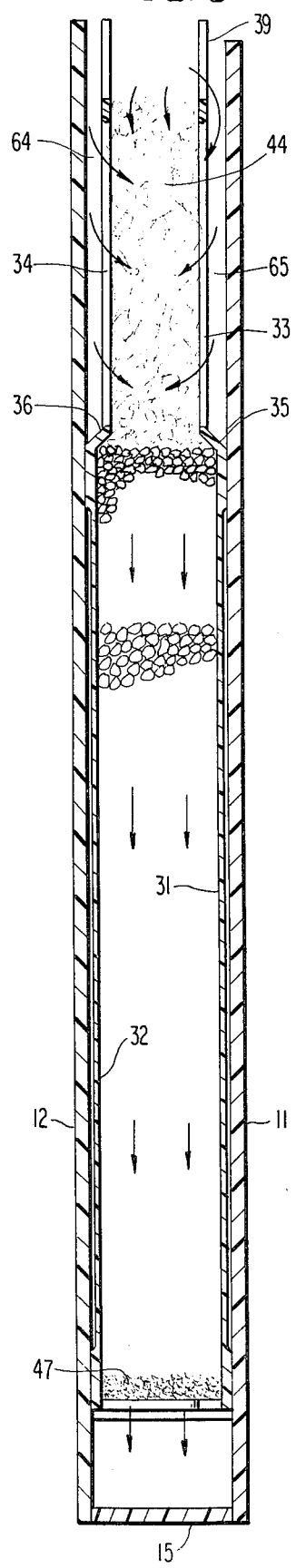
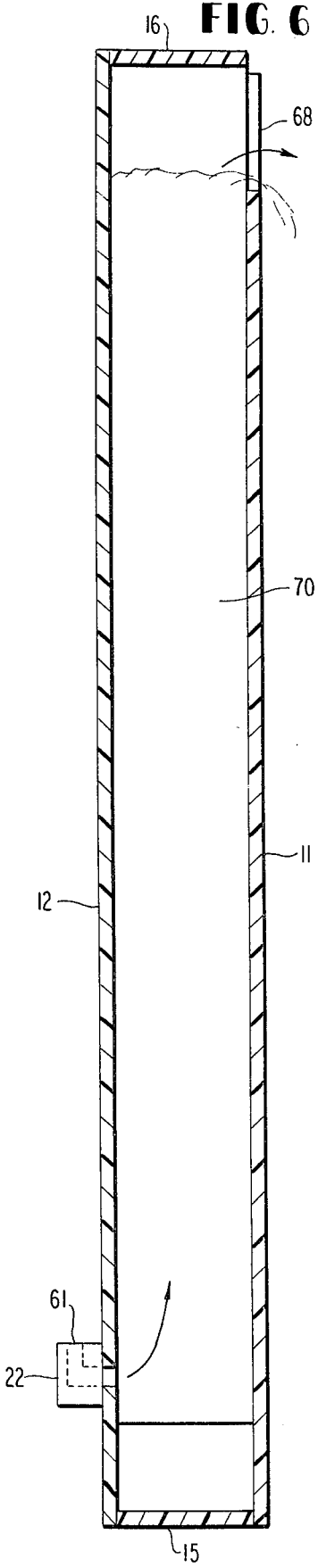

SYSTEM AND METHOD FOR REMOVING AMMONIA FROM WASTEWATER

DESCRIPTION

1. Field of the Invention

This invention relates to methods and systems for removing ammonia from wastewater and especially to methods and systems for removing ammonia from water used in growing aquatic life.

This invention is disclosed, at least in part, in Disclosure Document No. 089026 entitled "A Life Support System and Processes for Raising Fish in a Closed System," and reference is made to that Document for material contained therein.

BACKGROUND ART

Ammonia is present in many wastewaters as a result of decomposition of nitrogenous waste products, such as urea and proteins, or as a result of protein metabolism by many aquatic animals, and can have harmful effects including increased eutrophication of lakes and depletion of dissolved oxygen. Ammonia is extremely toxic to aquatic animals and even at low levels can inhibit their growth. Reducing the concentration of ammonia to a harmlessly low level is therefore important for wastewaters which are to be returned to the environment, and it is essential for waters used to raise aquatic life. Closed systems for raising fish where the water is recycled especially need to include a water treatment step to remove ammonia since the fish density may be high and the ammonia will build up to toxic levels quickly in the absence of a method of removing it.

Four methods which have been used for removing ammonia from waters are (1) use of nitrifying bacteria to convert ammonia to nitrites and nitrates, referred to as biological filtration, (2) use of ion exchange materials to remove the ammonia from the water, (3) air stripping and (4) breakpoint chlorination. Of these methods, only the first two are useful for recirculating systems for aquatic life.

A biological filter may comprise an inert material, such as sand, gravel, plastics, and fibrous material, which serves as a substrate to hold bacteria which act on the ammonia in the water. Biological filters have limitations and their use can present problems since there are conditions under which the filter can be inoperative. The filter may be virtually inoperative upon start-up since it may take several weeks to establish a biological filter; low temperatures inhibit the nitrifying action; chemicals such as antibiotics used for disease control can kill the bacteria; the filter is not readily amenable to handling significant increases in ammonia concentration, as may occur upon addition of a large quantity of fish to a tank; and decrease in ammonia concentration below that needed for subsistence of the bacteria will cause bacteria to die and slough off, leaving the biological filter temporarily only partially effective in nitrifying ammonia.

The use of ion exchange resins presents different problems, primarily in the regeneration which is usually accomplished by exchange with chemical reagents. The regeneration of chemicals may be costly, and if neglected will result in ammonia break-through and the consequences following the elevated ammonia concentration.

SUMMARY OF THE INVENTION

It is accordingly one object of this invention to provide an improved method and system for removing ammonia from wastewaters.

It is another object to provide a method and system for removing ammonia from wastewaters which will automatically accommodate significant fluctuations in ammonia concentration, and provide an effluent having a low ammonia concentration.

It is still another object to provide a method and system for removing ammonia from wastewater employing ion exchangers to sorb ammonium wherein the ion exchange material is regenerated without the use of chemicals to replace ammonium on the ion exchangers.

It is yet another object to provide a method and system for treating wastewater with ion exchange materials wherein the ion exchangers are substantially continuously being regenerated.

It is another object to provide an improved method and system for removing ammonia from water used to raise aquatic life.

In accordance with this invention a method is provided for treating wastewater containing amonia comprising the steps of providing a bed of ion exchange particles as a substrate for nitrifying bacteria, said ion exchange particles having ammonia exchange properties; establishing a growth of nitrifying bacteria on said ion exchange particles; and contacting the bacteria-containing particles with said wastewater under conditions whereby ammonium is transferred from the wastewater to the ion exchange particles and is converted to an oxygen-containing nitrogen compound.

In the preferred form of the invention the bed of ion exchange particles is in series with and located downstream from another means for removing ammonia, most preferably a biological filter.

In the most preferred form of the invention the bed of ion exchange particles is in series with and located downstream from a biological filter for removing ammonia, a solids filter, and an organic filter.

The ion exchange bed does not need to be regenerated by chemical exchange methods and it has been unexpectedly discovered that the ammonium on the ion exchange particles is removed from the particles and oxidized by the bacteria even in the absence of significant concentrations of salts conventionally used to regenerate ion exchange resins. Furthermore, the effluent ammonium level can be held at a more constant concentration compared to a varying level for a conventional system employing a biological filter. The ion exchange resin bed therefore serves as an excellent back-up system for a biological filter in the event of a breakthrough of ammonia from the biological filter.

BRIEF DESCRIPTION OF THE DRAWINGS

FIG. 1 is an isometric view of one embodiment of this invention.

FIG. 2 is a plan view of the embodiment of FIG. 1.

FIG. 3 is a detail cross-section taken on line 3—of FIG. 2.

FIG. 4 is a detail cross-section taken on line 4—4 of FIG. 3.

FIG. 5 is a detail cross-section taken on line 5—5 of FIG. 3.

FIG. 6 is a detail cross-section taken on line 6—6 of FIG. 3.

FIG. 7 is an isometric view of one embodiment of a filter unit for the embodiment of FIG. 1.

BEST AND VARIOUS MODES FOR CARRYING OUT THE INVENTION

In carrying out the process of this invention wastewater containing ammonia is brought into contact with ion exchange material capable of exchanging ammonium and on which is a growth of nitrifying bacteria. The process of removing ammonium from the bed and nitrifying ammonium are carried on simultaneously.

The nitrifying bacteria are autotrophic organisms, that is, they are bacteria which are capable of using $CO_2$ or carbonates as a sole source of carbon and a simple inorganic nitrogen compound for metabolic synthesis. The two principal important genera are Nitrosomonas, which oxidizes ammonium to nitrite, and Nitrobacter, which is limited to the oxidation of nitrite to nitrate.

In order to convert the ammonium to nitrite and nitrate the bacteria need (1) a source of oxygen, (2) a source of carbon, and (3) a source of alkalinity.

The oxidation of ammonium to nitrite may be represented by the following equation:

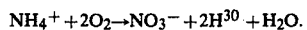

$$NH_4^+ + 2O_2 \rightarrow NO_3^- + 2H^{30} + H_2O.$$

As can be seen from this equation, the oxidation of one mol of ammonium requires two mols of oxygen, which may be furnished pure or as a component in a mixture such as air. The oxygen in the wastewater is suitably maintained at a concentration of at least about two parts per million and in the preferred method of carrying out this invention, is maintained at a concentration of from about five to about ten ppm.

The alkalinity needed to maintain a constant pH level is equivalent to two mols of bicarbonate or one mol of an alkali or alkaline earth carbonate per mol of ammonium oxidized. If alkalinity is provied by $CaCO_3$, about 7.14 milligrams of $CaCO_3$ is needed per milligram of ammonia nitrogen oxidized.

The carbon needed may come from a variety of carbon-containing compounds such as carbonates, bicarbonates, and organic componds such as methane. The preferred sources are the alkali and alkaline earth bicarbonates, such as sodium bicarbonate, since those serve not only as a carbon source, but also as a means for maintaining the pH at a suitable level. When sodium bicarbonate is used as a source of carbon as well as for alkalinity control, about three mols of sodium bicarbonate is needed for two mols of oxygen.

Simultaneous ammonium exchange and nitrification at adequate rates may be carried out within temperature and pH ranges which are also suitable for raising aquatic life. The temperature may range from about 4° C. to about 40° C. and for aquatic life is preferably in the range from about 10° C. to about 35° C.

The nitrification process may be carried out at pH levels from about 6 to about 8, and a pH level of about 8 is optimum. However, in treating wastewater used for aquatic life, the pH should be above about 6.3, and is preferably in the range from about 6.8 to about 8, and more preferably in the range of about 6.8 to about 7.2. These temperatures and pH values cover the optimum conditions within which much aquatic life can exist, and the specific conditions may be selected to be optimum for the aquatic life being grown.

The ammonium which has been exchanged is removed from the ion exchanger by nitrifying bacteria without the use of metal salts to exchange for the ammonium. Consequently, there is no requirement for a separate regeneration step which would require separate regeneration solutions and means for determining when regeneration is necessary. Furthermore, the discovery that salts are not needed for regeneration provides the basis for an efficient closed cycle recirculation system since the liquid in which regeneration is taking place can be recycled directly to an aquatic life environment. The concentration of metal ions in the wastewater may therefore be at a low level, i.e. less than 300 ppm although the nitrification will take place in wastewater, as for example seawater, having a high concentration of salts.

The ion exchange particles may be any natural or resin cation exchangers capable of exchanging ammonium. The preferred natural exchanger is clinoptilolite. The preferred cation exchange resins include the acid-form molecular sieves; acid-form zeolites; acid-form ion-exchange or cation polymeric materials such as the nuclear sulfonic, the methylene sulfonic, the carboxylic, the phosphonic, the phosphoric, and the phenolic polymeric materials. Among the ion-exchange polymeric materials in the acid form are sulfonated cured copolymers of styrene and divinylbenzene, copolymers of an acrylic acid (e.g., —acrilic or methacrylic acid) and divinylbenzene, the reaction products of phenol, acrolein, and the semiamide of oxalic acid, polystyrene methylene sulfonic acid, sulfonated phenol-aldehyde condensates, polystyrene-phosphorus acid, polystyrene-phosphoric acid, and phosphoric acid phenolic condensates.

The ion exchange particle size is not critical and the particles may suitably range in size from about 4 mesh to about 50 mesh. The smaller particles, i.e. those below about 20 mesh, work better than the larger particles and are thus preferred. The bed of ion exchange particles can also act as a solids filter when the particles are small, i.e. within a size range of about one to about 20 microns. These small particles may be produced by attrition of larger particles.

The bacteria would operate as a biological filter and prevent ion exchange with ammonium if they were to completely cover the outer surface of the ion exchange particles, as might occur upon an extended period of high ammonia concentration in the water reaching the ion exchangers. In such a situation, the ammonium in the wastewater will be removed to some extent by its conversion to nitrites and nitrates if not downstream from a biological filter. However, the rapid and virtually complete removal of ammonium due to ion exchange would not take place. However, since the bacteria die and slough off the ion exchange surfaces upon a decrease in ammonia concentration, fresh ion exchange surfaces are exposed after the ammonia is used up. Backflushing with ammonia-free water for a long period of time, as for example, from one to two days to about one week, is a useful technique for removing bacteria from the resin.

The process of removing ammonium from the wastewater by ion exchange particles and regenerating the resin with nitrifying bacteria is preferably carried out simultaneously and continuously, the wastewater continuously flowing through the bed of ion exchange particles. However, the ion exchange bed may be removed from the system for self-regeneration, and it may be desirable to replace a heavily-loaded bed with a fresh one when the concentration of ammonia in the wastewater is high enough so that breakthrough of ammonia is likely. The bed which is removed from the system may then be placed in an environment conducive to self-regeneration which will require a source of oxygen, water and alkalinity control. The bed which is removed is preferably contacted with a supply of substantially ammonia-free water.

The nitrifying bacteria may be established on the ion exchange material by contacting the ion exchanger with water which contains bacteria. In a natural state water containing ammonia produced from nitrogenous waste products will also contain bacteria. The concentration of bacteria in the water is not critical since bacteria deposited on the ion exchange particles will increase to a concentration high enough to become effective in regenerating the ion exchange resin.

In the preferred method of carrying out this invention, the ion exchange bed is located downwstream from a biological filter. The biological filter and ion exchange bed complement each other, the biological filter having the capability of continuously nitrifying relatively high concentrations of ammonia, and the ion exchange resin having a capability of rapidly absorbing and subsequently nitrifying ammonia which may break through the biological filter. The biological filter reduces the ammonia concentration in the wastewater to a level at which it can be continuously treated by the ion exchange bed. The ion exchange bed also has the ability to maintain the ammonia concentration at a constant lower level than is typically achieved by a biological filter at wastewater flow rates of interest.

The biological filter may consist of inert particles, such as sand, gravel, and plastic particles on which nitrifying bacteria become attached, and in a system where the biological filter comprises finely-divided particles the biological filter also acts as a solids filter. The biological filter may also comprise ion exchange material which acts as an inert material when continuously fed ammonia in a concentration high enough to support sufficient bacteria to completely cover the ion exchange sites.

In the preferred embodiment, the biological filter is constructed so that it does not capture solids, and in the most preferred form comprises a plurality of vertically extending tubular passageways defined by walls formed from an inert material, such as a plastic formed from polyethylene, polypropylene, or polystyrene. In one particular preferred embodiment, tubular passageways are rectangular in cross-section and those having a cross-sectional area of from about 0.16 to about 7 cm$^2$ have been found to be particularly suitable. This structure provides a high surface area for attachment of nitrifying bacteria, and yet is not easily susceptible to clogging which could stop water flow.

In one preferred embodiment of the biological filter, the walls of the tubular passageways, rectangular in cross-section, are comprised of a plurality of spaced apart, vertically-oriented, parallel sheets, separated by a plurality of spaced apart, vertically extending, parallel strips. The strips are preferably from about 0.4 to about 2.5 cm wide and are spaced from about 0.4 to about 2.5 cm apart. In one embodiment of this structure, the biological filter comprises a plurality of stacked units, each unit of which comprises two parallel sheets separated by thin, narrow strips disposed in a spaced, parallel array, each strip of which is attached at its edges and along its length to one face of each sheet. In this embodiment passageways are provided by each unit independently of other units.

In the most preferred embodiment the biological filter comprises a plurality of stacked subassemblies, each subassembly comprising a plurality of parallel spaced apart thin narrow strips each of which is attached at one of its edges along its length to one face of one sheet.

In a preferred system aeration means are provided at the lower end of the vertically-extending tubular passageways of the biological filter. The air not only provides a source of oxygen needed for nitrification, but the rising bubbles help scour the dead bacteria from the walls. The preferred aeration means at the lower end of the biological filter comprises a structure to emit fine bubbles, i.e. bubbles from less than about 1 mm to about 3 mm in diameter. The fine bubble diffuser is preferably constructed so that the points of bubble emission are in a straight line. The preferred diffuser structure may be formed by sandwiching porous material, such as cloth, felt, gauze, sponge, and porous plastics, between two strips of impermeable material, preferably a plastic such as polyethylene, polypropylene and polystyrene. Means are provided for introducing air into the zone containing the porous material, which resists air flow and emits air in fine bubbles.

In a preferred embodiment of this invention a solids removal means is in series with and preferably upstream from the ion exchange bed. The solids removal means may be in the wastewater stream prior to or subsequent to any biological filter in the system and may be in a solids removal system separate from the system for removing ammonia. For example, the solids filtration system disclosed in U.S. Pat. No. 4,133,760 issued Jan. 9, 1979 to Ogawa may be used in conjunction with this invention. In a preferred system the wastewater flows first through a biological filter then through a solids removal means and then through an ion exchange bed. With this sequence, slime biota formed by bacteria which slough from the biological filter surfaces is captured by the solids removal filter.

In a preferred system, as will be discussed in more detail with relation to a preferred embodiment, a fluid bypass for the solids removal system is provided. This ensures a continuing flow and oxygenation and removal of ammonia from the wastewater in the event trapped solids plug the solids removal means. This bypass is particularly important in systems provided with low pressure means for circulating the water.

Heterotrophic bacteria, i.e. bacteria which require complex organic compounds of carbon and nitrogen for metabolic synthesis, grow in the presence of organic material, and in the presence of sufficient organic material may dominate the autotrophic bacteria. The nitrifiers may thus diminish and be washed from the system. Consequently, in a preferred embodiment of this invention the ion exchange bed is in series with and preferably downstream from a filter bed capable of removing organic material, such as a bed of activated charcoal. This bed serves to remove dissolved organic materials such as humic acid, pesticides and color bodies and inorganics such as chlorine from the wastewater. This bed may become covered with a biological film which reduces the effectiveness. Provision is therefore made in the preferred form of the invention for easy replacement of the organic filter since it has been found that this filter is not rejuvenated by backflushing. Typically this filter may need to be replaced every two to eight weeks, but it may last as long as about six months.

The wastewater may be moved through the system by a variety of means including mechanical pumping means. In one preferred system air is used to move the wastewater and not only pumps the water but also accomplishes the aeration necessary for nitrification.

In the most preferred embodiment of this invention, as will be illustrated below in a discussion of the drawing, the system includes a biological filter, a solids removal element which can be by-passed, an activated carbon bed and an ion exchange bed.

While this invention is useful in removing ammonia from wastewater from other sources, it is especially useful in treating water used in rearing aquatic life since it is capable of reducing the concentration of ammonia to a level below that at which it may be harmful to fish and other aquatic life, and its capability of self-generation makes it highly useful for use in aquariums which in some instances are subject to neglect.

The embodiment shown in the figures is well-adapted for use with an aquarium.

Referring to FIGS. 1 and 3, the outer structure of casing 10 comprises front wall 11, back wall 12, side walls 13 and 14, bottom wall 15 and top section 16. This casing is adapted to contain biological filters 50 and filter insert means 30 and is provided with interior walls 17, 18 and center walls 19, 20 which keep the filters in place and provide passageways for wastewater and purified water.

The biological filter 50 shown in detail in FIGS. 2, 3 and 4 comprises a plurality of tubular passageways 69 substantially rectangular in cross-section formed by a plurality of parallel plastic sheets 51 separated by transverse plastic strips 52. In the embodiment shown in the figures the biological filter 50 comprises a stack of sub-assemblies, each of which comprises 2 substantially parallel sheets 51 spaced apart by a plurality of thin narrow strips 52. The biological filter 50 is supported within casing 10 by ledges 24, 25, 26 and 27 which are attached to walls 13, 17, 18 and 14 respectively. The biological filter 50 may readily be inserted into and removed from the casing 10 through the opening at the top.

The filter insert means 30 shown in detail in FIGS. 3, 5 and 7 comprises side walls 40 and 41, apertured bottom wall 42, front wall 31 and back wall 32. The upper portion of the filter insert 30 comprises vertical front struts 33, and vertical back struts 34 connected at the top by horizontal retainers 37 and 38. This upper portion is necked down to provide fluid passageways 64 and 65 to provide additional surface for access of water to solids filter 44. The lower portions of struts 33 and 34 are held in place by inwardly sloping walls 35 and 36.

The filter insert 30 is dimensioned to fit snugly within the casing 10 and to be readily removable by lifting on tab 39.

Filter insert means 30 contains in descending order, solids filter 44, organic filter media 45, and ion exchange material 46. The lower portion comprises means 47 for retaining particulate solids.

Air is introduced into the wastewater from air supply means (not shown) into air passageways 60 and 61 in air inlet means 21 and 23 located at the lower portion of back wall 12 and then into fine bubble diffusers 28 and 29. These bubbles are preferably from less than about 1 mm to about 3 mm in diameter. The fine bubble diffuser 28 comprises a strip of porous material 28a sandwiched between two strips of plastic 28b and 28c. Plenum 28d located below the porous material 28a and between plastic strips 28b and 28c distributes air along the entire length of the lower edge of the porous material.

The water flows in directions as shown by the arrows and upon reaching the top 53 of biological filter 50, flows across to the upper portion of solids filter 44. The water flows downwardly through the top portion of filter 44, and through the fluid passageways 64 and 65, through the open areas between struts 33 and 34 into the solids filter 44 from the side. The water from which solids have been removed then passes through the organic filter 45, the ion exchange material 46, then through passageways 43 in bottom wall 42 of the filter sleeve 30.

An important feature of this embodiment of the invention is the wastewater bypass provided at the top of casing 10 since gravity is the only force acting to move water downwardly through the solids filter, and the head of water may only be a few inches. Consequently, the flow of water through the solids filter can be virtually stopped by an accumulation of solids. If the solids filter is blocked, the partially purified and oxygenated wastewater rises in the casing to the top edge of front wall 11 and overflows from the filter system. Inasmuch as, at this point, most of the ammonia has been removed from the water, and the water has been oxygenated, the system will still support aquatic life.

From the passageways 43 in bottom wall 42 the purified water flows toward the central portion of casing 10 into the vertical liquid passageway 70 formed by central walls 19 and 20 and back and front walls 12 and 11 of casing 10. The purified water is lifted upwardly by coarse bubbles of air, e.g. 3 to 20 mm in diameter, introduced into the lower portion of fluid passageway 70 through air passageway 62 in air inlet means 22. Water is lifted and leaves the system through port 68.

As noted, this embodiment is particularly well-adapted for use with an aquarium. The casing may be placed with wall 12 against an aquarium wall preferably with the upper edges of walls 11, 12, 13 and 14 above the water surface and preferably low enough in the water so that the upper edge of exit port 68 is slightly above the upper surface of the water. In the embodiment shown heaters to warm the water may be placed in the zones formed by the portions of wall 11 which extend beyond walls 13 and 14 and the aquarium wall.

The filter insert unit 30 is easily removed from the casing 10 and any one or all of the solids filter 44, organic filter 45 and ion exchange material 46 replaced if desired.

The biological filter 50 is also removable if desired.

Having thus described the invention, the following Example is offered to show an embodiment in more detail.

EXAMPLE

A purification system as shown in the figures having overall dimensions about 48 cm wide, about 27 cm high and about 3 cm deep was constructed of plastic. Each biological filter was a rectangular array of rectangular tubes about 2.5 cm wide and 15 cm long. The sheets and strips, which were about 0.5 mm in thickness, formed about 150 tubes, each of which had a cross-sectional area of about 0.25 cm$^2$. The filter extended from a point about 4 cm from the bottom to a point about 1.5 cm from the top of the casing. The inserts for containing the solids filter, activated carbon and ion exchange material were about 2.3 cm by about 7.5 cm in cross-section at the lower portion. The upper portion was narrowed to about 1.8 cm to provide an area about 3 mm by 7.5 cm in cross-section at each of the front and back sides and extending from the top to the lower portion of the solids removal filter. The zone occupied by the solids removal filter measured approximately 7 cm by 1.4 cm by 6 cm. There were 7 rectangular openings about 7 mm wide and 5.5 cm high in each of the front and back sides for water flow into the solids filter from the front and back. Each activated carbon filter contained about 50 cm$^3$ of carbon and each ion exchange bed contained about 170 cm$^3$ of clinoptilolite as ion exchange particles having an average size in the range of 8–20 mesh.

Wastewater containing about one ppm ammonia is moved into the system at a rate of about 320 cm$^3$ per minute. Air is bubbled into the lower zone below each biological filter to oxygenate and lift the wastewater through the biological filters, and is bubbled into the central zone to lift the purified water out of the system. The bubbles formed below the biological filter are about one mm in diameter, and those formed in the central zone are about 10 mm in diameter. The water leaving the biological filter contains less than 0.01 ppm ammonia, and the purified water leaving the ion exchange bed contains no detectable amount of ammonia. The system is operated under these conditions for eight weeks and at the end of that time the purified water still contains no detectable ammonia.

The foregoing Example is provided to show additional detail of one form of the preferred embodiment of this invention. Modification within the scope of the invention will be apparent to those working in the art and are intended to be within the purview of this invention. This invention is obviously useful in raising aquatic life other than that in aquariums, and can be used in raising food fish. It is also obvious that it may be used in treating wastewaters other than those derived from aquatic life.

I claim:

1. A method of treating wastewater containing ammonium comprising:
   providing a biological filter containing nitrifying bacteria;
   providing a bed of ion exchange particles downstream of said biological filter as a substrate for nitrifying bacteria, said ion exchange particles having ammonium exchange properties;
   contacting said wastewater with said biological filter;
   contacting the resulting bacteria-treated wastewater with said ion-exchange particles under conditions whereby ammonium is transferred from said wastewater to said particles and is converted to an oxygen-containing nitrogen compound.

2. The method of claim 1 wherein said wastewater has a pH in the range of about 6.0 to about 8.

3. The method of claim 1 wherein said wastewater contains dissolved oxygen in a concentration of at least about two ppm.

4. The method of claim 3 wherein said wastewater contains dissolved oxygen in a concentration from about 5 ppm to about 10 ppm.

5. The method of claim 1 wherein the temperature of said wastewater is in the range of about 4° C. to about 40° C.

6. The method of claim 1 wherein the total concentration of metal salts in said wastewater is less than about 300 ppm.

7. The method of claim 6 wherein the total concentration of alkali and alkaline earth metal salts is less than about 300 ppm.

8. The method of claim 1 wherein the salt composition of the wastewater is approximately equivalent to that of seawater.

9. The method of claim 1 wherein said method is carried out by continuously flowing wastewater through said biological filter and said bed.

10. The method of claim 1 wherein said method is carried out by intermittently flowing wastewater through said biological filter and said bed.

11. The method of claim 10 wherein said bed is provided with a source of oxygen and alkalinity when it is out of contact with said wastewater.

12. The method of claim 1 wherein said ion exchange particles comprise at least one cation exchange resin.

13. The method of claim 1 wherein said ion exchange particles comprise clinoptilolite.

14. The method of claim 13 wherein said ion exchange particles have an average particle size of from about 4 mesh to about 50 mesh.

15. The method of claim 1 wherein the biological filter comprises solids' filtration media as a substrate for nitrifying bacteria.

16. The method of claim 1 wherein the biological filter comprises ion exchange particles.

17. The method of claim 1 wherein the wastewater passes through a solids removal filter before contacting the ion exchange particles.

18. The method of claim 1 wherein the wastewater is passed through the biological filter and a solids removal filter and is then contacted with the ion exchange particles.

19. The method of claim 18 wherein the wastewater is passed through the biological filter before it is passed through the solids removal filter.

20. The method of claim 1 wherein the wastewater is aerated before passing it through the biological filter.

21. The method of claim 1 wherein said wastewater is obtained from an aquatic culture tank and the treated wastewater is recycled to said tank.

22. The method of claim 21 wherein said wastewater is oxygenated to a level of at least about 2 ppm of oxygen before contact with said ion exchange particles.

23. The method of claim 22 wherein said wastewater is maintained at a pH from about 6.3 to about 8.6 and at a temperature from about 10° C. to about 35° C.

24. The method of claim 21 wherein said wastewater is passed sequentially through the biological filter and a solids removal filter and is then contacted with the ion exchange particles.

25. The method of claim 24 wherein said biological filter comprises bacteria-supporting walls which define a plurality of unobstructed passageways for the flow of wastewater.

26. The method of claim 24 wherein said biological filter comprises a plurality of vertically extending tubular passageways in a close-packed array, and said wastewater is introduced into said biological filter at the lower end of said tubular passageways.

27. The method of claim 26 wherein a horizontal cross-section of said tubular passageways is represented by straight lines.

28. The method of claim 26 wherein each of said tubular passageways is rectangular in horizontal cross-section.

* * * * *